United States Patent
Chatterji et al.

(10) Patent No.: US 6,681,856 B1
(45) Date of Patent: Jan. 27, 2004

(54) METHODS OF CEMENTING IN SUBTERRANEAN ZONES PENETRATED BY WELL BORES USING BIODEGRADABLE DISPERSANTS

(75) Inventors: Jiten Chatterji, Duncan, OK (US); D. Chad Brenneis, Marlow, OK (US); Roger S. Cromwell, Walters, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/439,491

(22) Filed: May 16, 2003

(51) Int. Cl.$^7$ ............................................... E21B 33/14
(52) U.S. Cl. ....................... 166/294; 166/292
(58) Field of Search ................... 166/292, 293, 166/294, 295

(56) References Cited

U.S. PATENT DOCUMENTS

| | | | |
|---|---|---|---|
| 3,132,693 A | 5/1964 | Weisend | 166/33 |
| 3,359,225 A | 12/1967 | Weisend | 260/29.6 |
| 4,515,635 A | 5/1985 | Rao et al. | 106/90 |
| 4,555,269 A | 11/1985 | Rao et al. | 106/90 |
| 4,676,317 A | 6/1987 | Fry et al. | 166/293 |
| 4,687,516 A | 8/1987 | Burkhalter et al. | 106/90 |
| 4,703,801 A | 11/1987 | Fry et al. | 166/293 |
| 4,818,288 A | 4/1989 | Aignesberger et al. | 106/90 |
| 5,290,869 A * | 3/1994 | Kinoshita et al. | 525/291 |
| 5,389,706 A * | 2/1995 | Heathman et al. | 166/293 |
| 5,908,885 A | 6/1999 | Sikes et al. | 524/5 |
| 6,019,835 A | 2/2000 | Chatterji et al. | 106/725 |
| 6,133,347 A | 10/2000 | Vickers, Jr. et al. | 524/8 |
| 6,136,950 A | 10/2000 | Vickers, Jr. et al. | 528/363 |
| 6,182,758 B1 | 2/2001 | Vijn | 166/293 |
| 6,268,406 B1 | 7/2001 | Chatterji et al. | 523/130 |
| 6,284,867 B1 | 9/2001 | Vickers, Jr. et al. | 528/363 |
| 6,310,143 B1 | 10/2001 | Vickers, Jr. et al. | 525/327.6 |
| 6,419,016 B1 | 7/2002 | Reddy | 166/293 |
| 6,429,266 B2 | 8/2002 | Vickers, Jr. et al. | 525/420 |
| 6,451,881 B1 | 9/2002 | Vickers, Jr. et al. | 524/8 |
| 6,454,004 B2 | 9/2002 | Reddy et al. | 166/293 |
| 2002/0013422 A1 | 1/2002 | Vickers, Jr. et al. | 525/420 |

FOREIGN PATENT DOCUMENTS

| | | | |
|---|---|---|---|
| DE | 103 14 354.8 | 3/2003 | |
| WO | WO 00/00536 | 1/2001 | C08G/81/00 |

OTHER PUBLICATIONS

Halliburton brochure entitled "CFR–3 Cement Friction Reducer Dispersant" dated 1998.
Halliburton brochure entitled "Halad® Fluid–Loss Additive" dated 1999.
Halliburton brochure entitled "Halad®–23 Fluid–Loss Additive" dated 2000.
Halliburton brochure entitled "Halad®–344 Fluid–Loss Additive" dated 1998.
Halliburton brochure entitled "Halad®–413 Fluid–Loss Additive" dated 1998.

* cited by examiner

Primary Examiner—David Bagnell
Assistant Examiner—Jennifer R Dougherty
(74) Attorney, Agent, or Firm—Craig W. Roddy; C. Clark Dougherty, Jr.

(57) ABSTRACT

The present invention provides methods of cementing subterranean zones penetrated by well bores using biodegradable dispersants. A cement composition of the invention comprises a hydraulic cement, sufficient water to form a slurry and a water soluble biodegradable cement dispersant comprising a polyamide graft copolymer containing at least o e side chain formed from aldehydes and sulfur-containing acids or their salts.

32 Claims, No Drawings

METHODS OF CEMENTING IN SUBTERRANEAN ZONES PENETRATED BY WELL BORES USING BIODEGRADABLE DISPERSANTS

BACKGROUND OF THE INVENTION

1. Field of the Invention

The present invention relates to improved methods of cementing subterranean zones penetrated by well bores using biodegradable dispersants.

2. Description of the Prior Art

Subterranean zones penetrated by well bores are commonly sealed by hydraulic cement compositions. For example, hydraulic cement compositions are used in primary cementing operations whereby strings of pipes such as casing and liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hardened substantially impermeable cement therein which supports and positions the pipe string in the well bore and seals the exterior surfaces of the pipe string to the walls of the well bore. Hydraulic cement compositions are also utilized in a variety of cementing operations such as sealing highly permeable zones or fractures in subterranean zones, plugging cracks or holes in pipe strings and the like.

Dispersing agents are commonly included in hydraulic cement compositions used for cementing subterranean zones. The dispersing agents reduce the rheologies of the cement compositions, i.e., the apparent viscosities and other properties of the cement compositions, as well as reducing the water content of the cement compositions. The reduction of the rheology of a cement composition allows the cement composition to be pumped with less friction pressure and less pump horse power. In addition, the lower rheology often allows the cement composition to be pumped in turbulent flow. Turbulent flow characteristics are desirable when pumping cement compositions in wells in that drilling fluid is more efficiently removed from surfaces in the well bore as the drilling fluid is displaced by the cement compositions being pumped. The inclusion of dispersing agents in cement compositions is also desirable in that the presence of the dispersing agents reduces the water required for preparation of the cement compositions. Cement compositions having reduced water content set into cement masses having improved compressive strengths.

A number of dispersing agents have been utilized heretofore in cement compositions, particularly in cement compositions used for primary and remedial cementing in oil and gas wells. However, most of such dispersing agents are also strong cement composition set retarding agents which is often undesirable. That is, the presence of such a dispersant in a cement composition prevents the cement composition from setting for a relatively long period of time which is often costly or otherwise detrimental. While various other cement dispersants have been developed and used which do not substantially increase the setting time of cement compositions, they are not environmentally acceptable, especially in offshore operations in that they do not undergo complete biodegradation in the environment and cause damage to aquatic and other life therein. Thus, there are continuing needs for improved biodegradable cement composition dispersants and improved cement compositions containing such dispersants.

SUMMARY OF THE INVENTION

The present invention provides improved methods and compositions for cementing subterranean zones penetrated by well bores which meet the needs described above and overcome the deficiencies of the prior art. The methods of the invention for cementing subterranean zones penetrated by well bores basically comprise the following steps. A cement composition that comprises a hydraulic cement, sufficient water to form a slurry and a water soluble biodegradable cement dispersant comprising a polyamide graft copolymer containing at least one side chain formed from aldehydes and sulfur-containing acids or their salts is prepared or provided. The cement composition is placed in the subterranean zone to be cemented, and then the cement composition is allowed to set into a solid mass therein.

A well cement composition of this invention basically comprises a hydraulic cement, sufficient water to form a slurry and a water soluble biodegradable cement dispersant comprising a polyamide graft copolymer containing at least one side chain formed from aldehyde and sulfur-containing acids or their salts.

The objects, features and advantages of the present invention will be readily apparent to those skilled in the art upon a reading of the description of preferred embodiments which follows.

DESCRIPTION OF PREFERRED EMBODIMENTS

The methods of cementing a subterranean zone penetrated by a well bore in accordance with the present invention comprise the following steps. A cement composition is prepared or provided that comprises a hydraulic cement, sufficient water to form a slurry and a water soluble biodegradable cement dispersant. The cement composition is placed in a subterranean zone to be cemented and the cement composition is then allowed to set into a solid mass therein.

The cement compositions of this invention basically comprise a hydraulic cement, sufficient water to form a slurry, and a water soluble biodegradable cement dispersant comprising a polyamide graft copolymer containing at least one side chain formed from aldehydes and sulfur-containing acids or their salts.

The polyamide component of the graft copolymer is a natural polyamide. Examples of such natural polyamides which can be utilized include, but are not limited to, casein, gelatin, soy protein, polyaspartic acid, collagens, bone binders, blood albumins, and their degradation products. Of these, gelatin is generally preferred. The polyamide component is generally present in the graft copolymer in an amount in the range of from about 5% to about 80% by weight, more preferably in an amount of from about 10% to about 60% by weight.

Examples of the aldehyde component of the graft copolymer include, but are not limited to, paraformaldehyde, paraldehyde, formaldehyde, acetaldehyde, and glyoxal. Of these, formaldehyde is generally preferred. The aldehyde component of the graft copolymer is generally present therein in an amount in the range of from about 5% to about 90% by weight, more preferably in an amount from about 10% to about 70% by weight.

Examples of the sulfur-containing acid or salt thereof component of the graft copolymer include, but are not limited to, inorganic sulfite salts, hydrogen sulfite, bisulfites of alkaline earth metals, aluminum, iron and ammonium, napthalenesulfonic acid and its salts, and benzenesulfonic acid and its salts. Of these, inorganic sulfite salts are preferred with sodium sulfite being the most preferred. The sulfur-containing acid or salt component of the graft copolymer is present therein in an amount in the range of from about 5% to about 60% by weight, more preferably in an amount from about 15% to about 40% by weight.

The side chain formed from aldehydes and sulfur-containing acids or their salts can also include at least one additional compound selected from the group consisting of ketones, aromatic alcohols and aminoplastic-forming agents such as dicyanodiamide, urea derivatives, aminio-s-triazines, melamines, and melamine derivatives. Of these, ketones are preferred such as acetone, 2-propanone, 2-butanone, and pyruvic acid. Of these, acetone is the most preferred. When included, the additional compound in the side chain is present in the graft copolymer in an amount in the range of from about 5% to about 85% by weight, more preferably in an amount of from about 10% to about 70% by weight.

The biodegradable cement dispersant is prepared by graft polymerization at temperatures between −10° C. and 250° C. The polymerization is conducted in the presence of a solvent such as water or dimethyl sulfoxide. Alternatively, the dispersant can be prepared by thermal treatment.

A particularly preferred biodegradable cement graft copolymer dispersant comprises gelatin present in an amount of about 42% by weight, a 37% by weight solution of formaldehyde present in an amount of about 22% by weight, sodium sulfite present in an amount of about 18% by weight, and acetone present in an amount of about 18% by weight. The water soluble biodegradable polyamide graft copolymer useful in accordance with the present invention is described in greater detail in German Patent Application No. DE 103 14 354.8 entitled WATER-SOLUBLE BIODEGRADABLE POLYAMIDE-BASED COPOLYMERS AND THEIR USE filed on Mar. 31, 2003 (inner priority Dec. 11, 2000 for DE 102 57 701.3) which is incorporated in its entirety herein by reference thereto.

Examples of hydraulic cements that can be utilized in the cement compositions of this invention include, but are not limited to, Portland cements, slag cements, pozzolana cements, gypsum cements, aluminous cements and silica cements. Portland cements and their equivalents are generally preferred for use in accordance with the present invention. Portland cements of the types defined and described in API Specification for Materials and Testing for Well Cements, API Specification 10, $5^{th}$ Edition, dated Jul. 1, 1990 of the American Petroleum Institute are particularly preferred.

The water in the cement compositions can be fresh water or salt water. The term "salt water" is used herein to mean unsaturated salt solutions and saturated salt solutions including brines and seawater. The water is present in the cement compositions in amounts sufficient to form a pumpable slurry. Generally, the water is present in an amount in the range of from about 30% to about 63% by weight of hydraulic cement in the compositions.

The water soluble biodegradable graft copolymer cement dispersant is generally present in the cement compositions of this invention in an amount in the range of from about 0.25% to about 5% by weight of cement therein, more preferably in an amount of about 1%.

Examples of the preparation of various biodegradable graft copolymer cement dispersants of this invention include, but are not limited to, the following:

(No. 1) A biodegradable graft copolymer cement dispersant comprising casein, formaldehyde, sodium sulfite, and acetone is prepared as follows. 20 grams of casein is dissolved in 210 grams of water. 17.5 grams of sodium sulfite and 16.5 grams of acetone are added to the casein solution. The solution is heated to 140° F. followed by slow addition of 80 grams of 30% aqueous formaldehyde solution. The solution is stirred for two hours at 158° F. and the pH of the reaction solution is adjusted to 7 with formic acid. The solution is then concentrated to half the original volume by vacuum distillation to remove methanol produced by the competing Canizarro reaction.

(No.2) A biodegradable graft copolymer cement dispersant comprising gelatin, formaldehyde, sodium sulfite and acetone is prepared as follows. 240 grams of gelatin are dissolved in 600 grams of water containing 100 grams of sodium sulfite and 100 grams of acetone. Following the addition of 350 grams of a 37% by weight aqueous formaldehyde solution, the mixture is heated to 140° F. The pH of the solution is adjusted to 7 with formic acid and heated for two hours at 176° F. The reaction solution is distilled in a vacuum to remove methanol.

(No.3) A biodegradable graft copolymer cement dispersant comprising casein, sodium sulfite, acetone and sodium pyrosulfite is prepared as follows. 100 grams of sodium sulfite and 100 grams of acetone are dissolved in 250 grams of water. The solution is heated to 140° F. Then 467 grams of 30% aqueous formaldehyde solution are added. The reaction solution is stirred for 40 minutes at 158° F. At the end of 40 minutes, 7.26 grams of sodium pyrosulfite are added and the solution is stirred for an additional 30 minutes. The pH of the solution is adjusted to 7.0 with formic acid. The solution is distilled under vacuum to remove methanol. The residual solution is diluted to 6 liters with distilled water and 340 grams of casein. The resulting polymer solution is dried whereby grafting of the backbone takes place.

(No.4) A biodegradable graft copolymer cement dispersant comprising soy protein, formaldehyde, sodium sulfite, and acetone is prepared as follows. 100 grams of soy protein are added to 600 grams of water. The pH of the solution is adjusted to about 13 with sodium hydroxide. To this solution are added 104 grams of sodium sulfite and 98 grams of acetone. The mixture is then heated to 176° F. To the heated solution 356 grams of 30% aqueous formaldehyde solution are added drop wise with vigorous agitation. The pH of the solution is adjusted to 7 with formic acid. Methanol produced by a competing Canizarro reaction is completely distilled off under vacuum to produce the condensation product.

(No.5) A biodegradable graft copolymer cement dispersant comprising polyaspartic acid, acetaldehyde, sodium sulfite and pyrocatechol is prepared as follows. 15.9 grams of polyaspartic acid is dissolved in 100 grams of water. The solution is cooled to 35.6° F. To the chilled solution is added 34.8 grams of sodium sulfite and 36 grams of pyrocatechol. Then, 40.9 grams of acetaldehyde is added drop wise taking precaution not to raise the temperature of the solution above 53.6° F. Upon completion of the addition, the temperature is raised to 167° F. and agitated for two hours at that temperature. The solution is cooled to 68° F. and the pH is adjusted to 7 by formic acid. The solution is concentrated to half its volume under vacuum.

(No.6) A biodegradable graft copolymer cement dispersant comprising gelatin, glyoxal and urea is prepared as follows. 39.77 grams of gelatin are added to 100 milliliters of dimethyl sulfoxide. To the solution is added 17.4 grams of sodium sulfite and 16.4 grams of urea with stirring. The mixture is heated to 140° F., followed by the addition of 6.9 grams of 40% aqueous glyoxal solution. The reaction mixture is then heated to 167° F. and held at that temperature for two hours. The dimethyl sulfoxide is then removed under reduced pressure.

(No.7) A biodegradable graft copolymer cement dispersant is comprising polyaspartic acid, formaldehyde, sodium pyrosulfite and melamine is prepared as follows. 150 grams of 30% aqueous formaldehyde solution is heated to 86° F. Then, 63 grams of melamine and 50 grams of sodium pyrosulfite are added, followed by 95 grams of a 15% solution of sodium hydroxide. To this solution is added 280 grams of water.

The pH of the solution was adjusted to 3 with sulfuric acid. 70 grams of a 40% aqueous solution of polyaspartic acid was then added to the solution. The solution is raised to a temperature of 160° F. and held at that temperature for two hours. The reaction solution is concentrated to ⅓ of its original volume with reduced pressure and a temperature of 176° F. The solution is cooled and the pH is adjusted to 7 with sodium hydroxide.

In addition to the above described biodegradable graft copolymer cement dispersants numerous other dispersants of this invention can be prepared using the various chemical components described herein.

A preferred method of cementing a subterranean zone penetrated by a well bore comprises the steps of: (a) preparing or providing a cement composition that comprises a hydraulic cement, sufficient water to form a slurry and a water soluble biodegradable cement dispersant comprising a polyamide graft copolymer containing at least one side chain formed from aldehydes and sulfur-containing acids or their salts; (b) placing the cement composition in the subterranean zone to be cemented; and (c) allowing the cement composition to set into a solid mass therein.

A preferred well cement composition of this invention comprises: a hydraulic cement; sufficient water to form a slurry; and a water soluble biodegradable cement dispersant comprising a polyamide graft copolymer containing at least one side chain formed of aldehydes and sulfur-containing acids or their salts.

In order to illustrate the methods and compositions of this invention further, the following examples are given.

EXAMPLE 1

The biodegradabilities of the graft copolymer cement dispersants prepared as described above were determined, i.e., the dispersant comprising gelatin, formaldehyde, sodium sulfite and acetone (No. 2) and the dispersant comprising casein, formaldehyde, sodium sulfite and acetone (No. 3). The biodegradabilities of the graft copolymers were determined in accordance with OECD 306 (Organization for Economic Cooperation and Development—306). That is, the biodegradabilities after 28 days were determined based on the ratios of the biological to theoretical oxygen demand and compared with the biodegradability of polyaspartic acid. The results of these tests are as follows.

| Polymer | Biodegradation after 28 days |
| --- | --- |
| Polyaspartic Acid | 35% |
| Polymer 2. | 38% |
| Polymer 3. | 42% |

From the above it can be seen that polymers No.2 and No.3. had biodegradabilities comparable to the biodegradability of polyaspartic acid.

EXAMPLE 2

The rheologies of cement compositions containing a non-biodegradable prior art dispersant, i.e., formaldehyde, acetone and a bisulfite condensate, which is commercially available under the trade designation "CFR-3™" from Halliburton Energy Services of Duncan, Okla., was compared with a dispersant of the present invention, i.e., the dispersant comprising gelatin, formaldehyde, sodium sulfite and acetone (No. 2 above). The results of these tests are set forth in Table I below.

TABLE I

Rheology Data of Cements Containing Dispersant Additives At Different Temperatures
Slurry Composition:
Joppa H Cement + Additive + 4.45 gal/sk Water Mixed at 16.4 lb/gal

| % Additive | ° F. | 600 rpm | 300 rpm | 200 rpm | 100 rpm | 60 rpm | 30 rpm | 6 rpm | 3 rpm |
| --- | --- | --- | --- | --- | --- | --- | --- | --- | --- |
| — | 80 | 128 | 81 | 66 | 50 | 42 | 35 | 18 | 14 |
| 0.5 "CFR-3 ™ " | 80 | 65 | 27 | 16 | 8 | 4 | 2 | 0 | 0 |
| 0.5 No. 2 | 80 | 81 | 36 | 22 | 10 | 5 | 2 | 0 | 0 |
| 0.75 "CFR-3 ™ " | 80 | 80 | 35 | 22 | 10 | 5 | 2 | 0 | 0 |
| 0.75 No. 2 | 80 | 92 | 42 | 27 | 12 | 6 | 2 | 0 | 0 |
| 1.0 "CFR-3 ™ " | 80 | 78 | 35 | 21 | 10 | 5 | 2 | 0 | 0 |
| 1.0 No. 2 | 80 | 92 | 45 | 27 | 12 | 6 | 2 | 0 | 0 |
| — | 130 | 147 | 125 | 108 | 89 | 78 | 60 | 24 | 16 |
| 0.5 "CFR-3 ™ " | 130 | 60 | 10 | 7 | 3 | 2 | 1 | 0 | 0 |
| 0.5 No. 2 | 130 | 43 | 18 | 11 | 4 | 3 | 1 | 0 | 0 |
| 0.75 "CFR-3 ™ " | 130 | 31 | 13 | 8 | 4 | 2 | 1 | 0 | 0 |
| 0.75 No. 2 | 130 | 43 | 18 | 11 | 4 | 2 | 1 | 0 | 0 |
| 1.0 "CFR-3 ™ " | 130 | 26 | 10 | 6 | 3 | 1 | 1 | 0 | 0 |

TABLE I-continued

Rheology Data of Cements Containing Dispersant Additives At Different Temperatures
Slurry Composition:
Joppa H Cement + Additive + 4.45 gal/sk Water Mixed at 16.4 lb/gal

| % Additive | ° F. | 600 rpm | 300 rpm | 200 rpm | 100 rpm | 60 rpm | 30 rpm | 6 rpm | 3 rpm |
|---|---|---|---|---|---|---|---|---|---|
| 1.0 No. 2 | 130 | 51 | 22 | 13 | 5 | 2 | 1 | 0 | 0 |
| — | 180 | 147 | 140 | 115 | 96 | 79 | 53 | 24 | 16 |
| 0.5 "CFR-3 ™" | 180 | 23 | 10 | 6 | 4 | 3 | 1 | 0 | 0 |
| 0.5 No. 2 | 180 | 35 | 15 | 9 | 4 | 2 | 1 | 0 | 0 |
| 0.75 "CFR-3 ™" | 180 | 21 | 8 | 5 | 2 | 1 | 0 | 0 | 0 |
| 0.75 No. 2 | 180 | 25 | 10 | 6 | 2 | 1 | 0 | 0 | 0 |
| 1.0 "CFR-3 ™" | 180 | 21 | 7 | 5 | 2 | 1 | 0 | 0 | 0 |
| 1.0 No. 2 | 180 | 44 | 16 | 9 | 4 | 2 | 1 | 0 | 0 |

From Table I it can be seen that the rheological properties of the dispersants "CFR-3™" (acetone, formaldehyde and bisulfite condensate) and dispersant No. 2 (gelatin, formaldehyde, sodium sulfite and acetone) at 80° F., 130° F. and 180° F. show similar rheological properties at the same concentrations.

EXAMPLE 2

The rheologies of cements containing the dispersants described in Example 1 and sodium chloride or calcium chloride salt at various concentrations were determined at different temperatures. The results of these tests are set forth in Table II below.

TABLE II

Rheology Data of Cements Having Various Salt Concentrations Containing Dispersant Additives at Different Temperatures

| % Additive | NaCl, % | Temp., ° F. | 600 rpm | 300 rpm | 200 rpm | 100 rpm | 60 rpm | 30 rpm | 6 rpm | 3 rpm |
|---|---|---|---|---|---|---|---|---|---|---|
| Slurry Composition: Joppa H Cement + Additive + Salt + 4.05 gal/sk Water Mixed at 17.0 lb/gal ||||||||||| 
| — | 18 | 80 | 183 | 105 | 82 | 60 | 49 | 41 | 25 | 18 |
| 1% "CFR-3 ™" | 18 | 80 | 120 | 57 | 37 | 18 | 10 | 5 | 0 | 0 |
| 1% No. 2 | 18 | 80 | 127 | 62 | 40 | 19 | 11 | 4 | 0 | 0 |
| — | 18 | 130 | 125 | 79 | 63 | 45 | 38 | 31 | 17 | 12 |
| 1% "CFR-3 ™" | 18 | 130 | 60 | 29 | 18 | 9 | 5 | 2 | 0 | 0 |
| 1% No. 2 | 18 | 130 | 68 | 34 | 21 | 10 | 6 | 2 | 0 | 0 |
| — | 18 | 180 | 300+ | 300+ | 165 | 121 | 96 | 70 | 37 | 40 |
| 1% "CFR-3 ™" | 18 | 180 | 45 | 20 | 14 | 7 | 5 | 3 | 1 | 1 |
| 1% No. 2 | 18 | 180 | 59 | 26 | 18 | 10 | 6 | 3 | 1 | 0 |
| Slurry Composition: Joppa H Cement + Additive + Salt + Water Mixed at 16.7 lb/gal |||||||||||
| — | 37 | 80 | 105 | 59 | 45 | 31 | 26 | 21 | 16 | 14 |
| 1% "CFR-3 ™" | 37 | 80 | 95 | 50 | 31 | 15 | 10 | 5 | 1 | 0 |
| 1% No. 2 | 37 | 80 | 81 | 44 | 28 | 14 | 8 | 3 | 0 | 0 |
| — | 37 | 130 | 70 | 42 | 33 | 24 | 20 | 16 | 12 | 10 |
| 1% "CFR-3 ™" | 37 | 130 | 68 | 35 | 23 | 12 | 8 | 4 | 1 | 1 |
| 1% No. 2 | 37 | 130 | 40 | 18 | 12 | 6 | 3 | 1 | 0 | 0 |
| — | 37 | 180 | 63 | 41 | 32 | 23 | 18 | 15 | 11 | 9 |
| 1% "CFR-3 ™" | 37 | 180 | 40 | 18 | 12 | 7 | 5 | 3 | 1 | 1 |
| 1% No. 2 | 37 | 180 | 32 | 15 | 9 | 4 | 2 | 1 | 0 | 0 |

| % Additive | CaCl$_2$, % | Temp., ° F. | 600 rpm | 300 rpm | 200 rpm | 100 rpm | 60 rpm | 30 rpm | 6 rpm | 3 rpm |
|---|---|---|---|---|---|---|---|---|---|---|
| Slurry Composition: Joppa H Cement + Salt + Additive + Water Mixed at 17.0 lb/gal |||||||||||
| — | 2 | 80 | 227 | 117 | 95 | 70 | 59 | 49 | 25 | 18 |
| 1% "CFR-3 ™" | 2 | 80 | 150 | 72 | 46 | 22 | 12 | 6 | 1 | 0 |
| 1% No. 2 | 2 | 80 | 185 | 92 | 59 | 27 | 15 | 7 | 1 | 0 |

Table II shows the rheological data of the dispersants using different concentrations of sodium chloride and calcium chloride at different temperatures. In 18% and saturated sodium chloride mixing water solutions, dispersant No. 2 performed similarly with dispersant "CFR-3™" in dispersing cement slurries. However, dispersant "CFR-3™" outperformed dispersant No. 2 in 2% calcium chloride mixing water solutions.

EXAMPLE 3

The rheologies of densified cement slurries containing 1% of dispersant "CFR-3™" and 1% of dispersant No. 2 at 80° F. were determined. The results of these tests are set forth in Table III below.

TABLE III

Rheology Data of Densified Slurries
Slurry Composition:
Joppa H Cement + Additive + 2.73 gal/sk Water Mixed at 18.5 lb/gal

| % Additive | Temp. ° F. | 600 rpm | 300 rpm | 200 rpm | 100 rpm | 60 rpm | 30 rpm | 6 rpm | 3 rpm |
|---|---|---|---|---|---|---|---|---|---|
| 1% "CFR-3 ™" | 80 | 300+ | 300+ | 300+ | 172 | 93 | 40 | 5 | 3 |
| 1% No. 2 | 80 | 300+ | 300+ | 300+ | 222 | 123 | 52 | 5 | 2 |

From Table III it can be seen that when rheological properties were compared in densified slurries (18.5 lb/gal), 1% of the dispersant "CFR-3™" gave better performance than dispersant No. 2.

EXAMPLE 4

The rheologies of heavy cement slurries containing various amounts of dispersant "CFR-3™" and dispersant No. 2 were determined at 80° F. The results of these tests are given in Table IV below.

TABLE IV

Heavy Slurry Rheology Data
Slurry Composition:
Joppa H Cement + Additive + 33.5% Iron Oxide + 35% Silica + 4.08 gal/sk Water Mixed at 19.5 lb/gal

| % Additive | Temp. ° F. | 600 rpm | 300 rpm | 200 rpm | 100 rpm | 60 rpm | 30 rpm | 6 rpm | 3 rpm |
|---|---|---|---|---|---|---|---|---|---|
| 0.5% "CFR-3 ™" | 80 | 300+ | 300+ | 300+ | 230 | 133 | 65 | 13 | 7 |
| 0.5% No. 2 | 80 | 300+ | 300+ | 300+ | 300+ | 182 | 98 | 26 | 24 |
| 0.75% "CFR-3 ™" | 80 | 300+ | 300+ | 300+ | 202 | 113 | 52 | 9 | 4 |
| 0.75% No. 2 | 80 | 300+ | 300+ | 300+ | 235 | 134 | 63 | 9 | 3 |
| 1% "CFR-3 ™" | 80 | 300+ | 300+ | 300+ | 200 | 114 | 53 | 8 | 3 |
| 1% No. 2 | 80 | 300+ | 300+ | 300+ | 210 | 121 | 56 | 7 | 3 |

Cement slurries containing iron oxide heavy weight material (19.5 lb/gal) are difficult to mix. However, when either 1% dispersant "CFR-3™" or dispersant No. 2 were combined with the cement slurry, the slurry was extremely easy to mix.

EXAMPLE 5

The rheologies of cements containing dispersant additives and fluid loss control additives were determined at different temperatures. The fluid loss control additives utilized were "HALAD-23™", "HALAD-344™" and "HALAD-413™" commercially available from Halliburton Energy Services of Duncan, Okla. The results of these tests are given in Table V below.

TABLE V

Rheology Data of Cements Containing Dispersant Additives and Fluid Loss Additives at Different Temperatures Slurry Composition:
Joppa H Cement + Additive + 4.28 gal/sk Water Mixed at 16.4 lb/gal

| % Additive | | Temp., ° F. | 600 rpm | 300 rpm | 200 rpm | 100 rpm | 60 rpm | 30 rpm | 6 rpm | 3 rpm |
|---|---|---|---|---|---|---|---|---|---|---|
| Halad-23% | | | | | | | | | | |
| 1.0 "CFR-3 ™" | 1 | 80 | 300+ | 300+ | 300+ | 300+ | 300+ | 233 | 67 | 43 |
| 1.0 No. 2 | 1 | 80 | 300+ | 300+ | 300+ | 300+ | 300+ | 286 | 82 | 47 |
| 1.0 "CFR-3 ™" | 1 | 180 | 300+ | 300+ | 300+ | 215 | 138 | 75 | 20 | 12 |
| 1.0 No. 2 | 1 | 180 | 300+ | 300+ | 300+ | 270 | 210 | 115 | 29 | 16 |

TABLE V-continued

Rheology Data of Cements Containing Dispersant Additives and
Fluid Loss Additives at Different Temperatures Slurry Composition:
Joppa H Cement + Additive + 4.28 gal/sk Water Mixed at 16.4 lb/gal

| | Halad-344% | Temp., °F. | 600 rpm | 300 rpm | 200 rpm | 100 rpm | 60 rpm | 30 rpm | 6 rpm | 3 rpm |
|---|---|---|---|---|---|---|---|---|---|---|
| 1.0 "CFR-3 ™" | 1 | 80  | 300+ | 300+ | 300+ | 230 | 146 | 80 | 18 | 10 |
| 1.0 No. 2     | 1 | 80  | 300+ | 300+ | 300+ | 245 | 159 | 88 | 20 | 10 |
| 1.0 "CFR-3 ™" | 1 | 180 | 300+ | 300+ | 255  | 132 | 82  | 43 | 10 | 5  |
| 1.0 No. 2     | 1 | 180 | 300+ | 300+ | 300+ | 202 | 129 | 71 | 17 | 9  |

Slurry Composition:
Joppa H Cement + Additive + Water Mixed at Mixed at 17.0 lb/gal

| | Halad-413% | Temp., °F. | 600 rpm | 300 rpm | 200 rpm | 100 rpm | 60 rpm | 30 rpm | 6 rpm | 3 rpm |
|---|---|---|---|---|---|---|---|---|---|---|
| 1.0 "CFR-3 ™" | 1 | 80  | 300+ | 280  | 190 | 94  | 54 | 25 | 4 | 2 |
| 1.0 No. 2     | 1 | 80  | 300+ | 300+ | 225 | 111 | 65 | 30 | 5 | 2 |
| 1.0 "CFR-3 ™" | 1 | 180 | 300+ | 163  | 106 | 50  | 29 | 13 | 2 | 1 |
| 1.0 No. 2     | 1 | 180 | 300+ | 174  | 115 | 56  | 32 | 15 | 2 | 1 |

From Table V it can be seen that both dispersants brought about improvement in the rheology of the slurries.

EXAMPLE 6

Fluid loss data was determined for cement slurries containing both fluid loss control additives and dispersants. The fluid loss control additives utilized were "HALAD-23™", "HALAD-344™" and "HALAD-9™" commercially available from Halliburton Energy Services of Duncan, Okla. The results of these tests are set forth in Table VI below.

TABLE VI

Fluid Loss Data

| % Additive | | Temp °F. | Fluid Loss cc/20 min |
|---|---|---|---|

Slurry Composition:
Joppa H Cement + Additive + 4.38 gal/sk Water Mixed at 16.4 lb/gal

| | Halad-23 % | | |
|---|---|---|---|
| 0.66 "CFR-3 ™" | 0.33 | 190 | 122 |
| 0.66 No. 2     | 0.33 | 190 | 240 |
| 0.5 "CFR-3 ™"  | 1    | 190 | 38  |
| 0.5 No. 2      | 1    | 190 | 52  |

| | Halad-344 % | | |
|---|---|---|---|
| 0.5 "CFR-3 ™" | 1 | 190 | 32 |
| 0.5 No. 2     | 1 | 190 | 24 |
| 1.0 "CFR-3 ™" | 1 | 190 | 36 |
| 1.0 No. 2     | 1 | 190 | 24 |

| | Halad-9 % | | |
|---|---|---|---|
| 0.66 "CFR-3 ™" | 0.33 | 190 | 228 |
| 0.66 No. 2     | 0.33 | 190 | 306 |

Slurry Composition:
Joppa H Cement + 35% SSA-1 + 0.5% HR-15 +
Additive + Water Mixed at 17.0 lb/gal

| | Halad-413 % | | |
|---|---|---|---|
| 0.5 "CFR-3 ™" | 1 | 190 | 32 |
| 0.5 No. 2     | 1 | 190 | 30 |
| 1.0 "CFR-3 ™" | 1 | 190 | 36 |
| 1.0 No. 2     | 1 | 190 | 30 |

From Table VI it can be seen that dispersant "CFR-3™" and dispersant No. 2 did not interfere in controlling fluid loss in the majority of instances and the dispersants enhanced the fluid loss control properties of cement slurries.

EXAMPLE 7

Thickening times of cement slurries containing the dispersant "CFR-3™" and dispersant No. 2 were determined. The results of these tests are set forth in Table VII below.

TABLE VII

Thickening Time Data
Slurry Composition:
Joppa H Cement + Additive + 3.99 gal/sk Water Mixed at 17.0 lb/gal

| % Additive | Temp °F. | Salt % | Thickening Time Hr:min |
|---|---|---|---|
| 1.0 "CFR-3 ™" | 125 | 0  | 8:04 |
| 1.0 No. 2     | 125 | 0  | 6:52 |
| 1.0 "CFR-3 ™" | 125 | 18 | 5:09 |
| 1.0 No. 2     | 125 | 18 | 7:17 |

As shown in Table VII, dispersant "CFR-3™" and dispersant No. 2 gave similar thickening times at 125° F. with or without the presence of sodium chloride.

EXAMPLE 8

The compressive strengths of cured cement slurries containing dispersant "CFR-3™" and dispersant No. 2 were determined. The results of the tests are set forth in Table VIII below.

TABLE VIII

Compressive Strength With Dispersants

Slurry Composition:
Joppa H Cement + Additive + 3.09 gal/sk Water Mixed at 18.0 lb/gal
Crushed Compressive Strength (psi)

| % Additive | Temp °F. | 24 Hour | 48 Hour |
|---|---|---|---|
| 0.5 "CFR-3 ™" | 140 | 6816 | 7433 |
| 0.5 No. 2     | 140 | 7023 | 7011 |

TABLE VIII-continued

Compressive Strength With Dispersants

Compressive Strengths on UCA (psi) Cured at 3000 Psi
Slurry Composition:
Joppa H Cement + Additive + 2.45 gal/sk Water Mixed at 19.0 lb/gal

| % Additive | Temp °F. | 12 Hour | 24 Hour | 72 Hour | 72 Hour Crush Strength |
|---|---|---|---|---|---|
| 0.5 "CFR-3 ™" | 200 | 9180 | 10,490 | 11,322 | 15,242 |
| 0.5 No. 2 | 200 | 7952 | 9027 | 10,164 | 18,483 |

UCA Crush Strength
Slurry Composition:
Joppa H Cement + Additive + 2.33 gal/sk Water Mixed at 19/1 lb/gal

| % Additive | Temp °F. | (psi) |
|---|---|---|
| 1% "CFR-3 ™" | 200 | 7718.3 |
| 1% No. 2 | 200 | 9172.1 |

From Table VIII, it can be seen that dispersant "CFR-3™" and dispersant No. 2 gave similar compressive strengths of cured slurries.

EXAMPLE 9

The effect on thickening time of cement slurries containing dispersant "CFR-3™" and dispersant No. 2 in the presence of the "HALAD-344™" fluid loss control additive was determined. The results of these tests are set forth in Table IX.

TABLE IX

Thickening Time Data
Slurry Composition:
Joppa H Cement + 1% Halad-344 + Additive +
4.38 gal/sk Water Mixed at 16.4 lb/gal

| % Additive | Temp °F. | Thickening Time Hr:min |
|---|---|---|
| — | 180 | 1:44 |
| 1.0 "CFR-3 ™" | 180 | 4:25 |
| 1.0 No. 2 | 180 | 4:38 |

From Table IX it can be seen that no discemable effect was observed on thickening time due to the presence of a fluid loss control additive in the cement slurry.

Thus, the present invention is well adapted to carry out the objects and attain the ends and advantages mentioned as well as those which are inherent therein. While numerous changes maybe made by those skilled in the art, such changes are encompassed within the spirit of this invention as defined by the appended claims.

What is claimed is:

1. A method of cementing a subterranean zone penetrated by a well bore comprising the steps of:
   (a) preparing or providing a cement composition that comprises a hydraulic cement, sufficient water to form a slurry and a water soluble biodegradable cement dispersant comprising a polyamide graft copolymer containing at least one side chain formed from aldehydes and sulfur-containing acids or their salts, said polyamide component of said graft copolylmer being a natural polyamide selected from the group consisting of casein, gelatin, soy protein, polyaspartic acid, collagens, bone binders, blood albumins, and their degradation products;
   (b) placing said cement compositions in said subterranean zone to be cemented; and
   (c) allowing said cement composition to set into a solid mass therein.

2. The method of claim 1 wherein said aldehyde component of said graft copolymer is selected from the group consisting of paraformaldehyde, paraldehyde, formaldehyde, acetaldehyde, and glyoxal.

3. The method of claim 1 wherein said sulfur containing acid or salt component of said graft copolymer is selected from the group consisting of inorganic sulfite salts, hydrogen sulfite, bisulfites of alkaline earth metals, aluminum, iron and ammonium, napthalenesulfonic acid and its salts, and benzenesulfonic acid and its salts.

4. The method of claim 1 wherein said side chain further comprises at least one compound selected from the group consisting of ketones, aromatic alcohols and aminoplastic-forming agents such as dicyanodiamide, urea derivatives, amino-s-triazines, melamines, and melamine derivatives.

5. The method of claim 4 wherein said ketones are selected from the group consisting acetone, 2-propanone, 2-butanone, and pyruvic acid.

6. The method of claim 4 wherein said compound is present in said graft copolymer in an amount in the range of from about 5% to about 85% by weight.

7. The method of claim 1 wherein said polyamide component of said graft copolymer is present therein in an amount in the range of from about 5% to about 80% by weight.

8. The method of claim 1 wherein said aldehyde component of said graft copolymer is present therein in an amount in the range of from about 5% to about 90% by weight.

9. The method of claim 1 wherein said sulfur containing acid or salt thereof component of said graft copolymer is present therein in an amount in the range of from about 5% to about 60% by weight.

10. The method of claim 1 wherein said water soluble biodegradable cement dispersant is prepared by graft polymerization at temperatures between −10° C. and 250° C. in the presence of a solvent such as water or dimethyl sulfoxide, or by thermal treatment.

11. The method of claim 1 wherein said biodegradable graft copolymer cement dispersant is comprised of gelatin present in an amount of about 42% by weight, a 30% by weight aqueous solution of formaldehyde present in an amount of about 22% by weight, sodium sulfite present in an amount of about 18% by weight, and acetone present in an amount of about 18% by weight.

12. The method of claim 1 wherein said hydraulic cement in said cement composition is selected from the group consisting of Portland cements, slag cements, pozzolana cements, gypsum cements, aluminous cements, and silica cements.

13. The method of claim 1 wherein said hydraulic cement is Portland cement.

14. The method of claim 1 wherein said water in said cement composition is selected from the group consisting of fresh water and salt water.

15. The method of claim 1 wherein said water is present id said cement composition in an amount in the range of from about 30% to about 63% by weight of cement therein.

16. The method of claim 1 wherein said water soluble biodegradable graft copolymer cement dispersant is present in said cement composition in an amount in the range of from about 0.25% to about 5% by weight of cement therein.

17. A well cement composition comprising:

a hydraulic cement;

sufficient water to form a slurry; and a water soluble biodegradable cement dispersant comprising a polyamide graft copolymer containing at least one side chain formed from aldehydes and sulfur containing acids or their salts, said polyamide component of said graft copolymer being a natural polyamide selected from the group consisting of casein, gelatin, soy protein, polyaspartic acid, collagens, bone binders, blood albumins, and their degradation products.

18. A well cement composition of claim 17 wherein said aldehyde component of said graft copolymer is selected from the group consisting of paraformaldehyde, paraldehyde, formaldehyde, acetaldehyde, and glyoxal.

19. The well cement composition of claim 17 wherein said sulfur containing acid or salt component of said graft copolymer is selected from the group consisting of inorganic. sulfite salts, hydrogen sulfite, disulfites of alkaline earth metals, aluminum, iron and ammonium, napthalenesulfonic acid and its salts, and benzenesulfonic acid and its salts.

20. The well cement composition of claim 17 wherein said side chain further comprises at least one compound selected from the group consisting of ketones, aromatic alcohols and aminoplastic-forming agents such as dicyanodiamide, urea derivatives, amino-s-triazines, melamines, and melamine derivatives.

21. The well cement composition of claim 20 wherein said ketones are selected from the group consisting acetone, 2-propanone, 2-butanone, and pyruvic acid.

22. The well cement composition of claim 20 wherein said compound is present in said graft copolymer in an amount in the range of from about 5% to about 85% by weight.

23. The well cement composition of claim 17 wherein said polyamide component of said graft copolymer is present therein in an amount in the range of from about 5% to about 80% by weight.

24. The well cement composition of claim 17 wherein said aldehyde component of said graft copolymer is present therein in an amount in the range of from about 5% to about 90% by weight.

25. The well cement composition of claim 17 wherein said sulfur containing acid or salt thereof component of said graft copolymer is present therein in an amount in the range of from about 5% to about 60% by weight.

26. The well cement composition of claim 17 wherein said water soluble biodegradable cement dispersant is prepared by graft polymerization at temperatures between $-10°$ C. and $250°$ C. in the presence of a solvent such as water or dimethyl sulfoxide, or by thermal treatment.

27. The well cement composition of claim 17 wherein said biodegradable graft copolymer cement dispersant is comprised of gelatin present in an amount of about 42% by weight, a 30% by weight aqueous solution of formaldehyde present in an amount of about 22% by weight, sodium sulfite present in an amount of about 18% by weight, and acetone present in an amount of about 18% by weight.

28. The well cement composition of claim 17 wherein said hydraulic cement in said cement composition is selected from the group consisting of Portland cements, slag cements, pozzolana cements, gypsum cements, aluminous cements, and silica cements.

29. The well cement composition of claim 17 wherein said hydraulic cement is Portland cement.

30. The well cement composition of claim 17 wherein said water in said cement composition is selected from the group consisting of fresh water and salt water.

31. The well cement composition of claim 17 wherein said water is present in said cement composition in an amount in the range of from about 30% to about 63% by weight of cement therein.

32. The well cement composition of claim 18 wherein said water soluble biodegradable graft copolymer cement dispersant is present in said cement composition in an amount in the range of from about 0.25% to about 5% by weight of cement therein.

\* \* \* \* \*